(12) United States Patent
Pop et al.

(10) Patent No.: US 10,102,930 B2
(45) Date of Patent: Oct. 16, 2018

(54) NUCLEAR FUEL ROD CLADDING INCLUDING A METAL NANOMATERIAL LAYER

(71) Applicant: AREVA NP Inc., Lynchburg, VA (US)

(72) Inventors: Mihai G. M. Pop, Alexandria, VA (US); Laurence Lamanna, Amherst, VA (US); Garry Garner, Lynchburg, VA (US); Brian Lockamon, Evington, VA (US)

(73) Assignee: Framatome Inc., Lynchburg, VA (US)

( * ) Notice: Subject to any disclaimer, the term of this patent is extended or adjusted under 35 U.S.C. 154(b) by 1203 days.

(21) Appl. No.: 14/079,221

(22) Filed: Nov. 13, 2013

(65) Prior Publication Data

US 2015/0131768 A1      May 14, 2015

(51) Int. Cl.
| | |
|---|---|
| G21C 21/14 | (2006.01) |
| G21C 3/07 | (2006.01) |
| G21C 3/06 | (2006.01) |
| G21C 21/02 | (2006.01) |

(52) U.S. Cl.
CPC .......... *G21C 3/07* (2013.01); *G21C 3/06* (2013.01); *G21C 21/02* (2013.01); *G21C 21/14* (2013.01); *Y02E 30/40* (2013.01)

(58) Field of Classification Search
CPC . G21C 21/02; G21C 3/07; G21C 3/06; G21C 21/14; C22F 1/00; C22C 16/00
USPC ............... 376/261, 414, 416, 457, 305, 306
See application file for complete search history.

(56) References Cited

U.S. PATENT DOCUMENTS

| | | | | |
|---|---|---|---|---|
| 3,594,288 A | * | 7/1971 | Reinert | C25D 5/36 205/149 |
| 5,352,266 A | * | 10/1994 | Erb | C25D 3/12 205/104 |
| 5,835,550 A | * | 11/1998 | Van Swam | G21C 3/07 376/457 |
| 6,793,883 B2 | * | 9/2004 | Andresen | G21C 17/0225 376/306 |
| 7,320,832 B2 | | 1/2008 | Palumbo et al. | |
| 7,354,354 B2 | | 4/2008 | Palumbo et al. | |

(Continued)

FOREIGN PATENT DOCUMENTS

| | | |
|---|---|---|
| DE | 198 44 759 A1 | 4/2000 |
| EP | 1 516 076 B1 | 2/2008 |
| JP | 3086207 B2 | 9/2000 |

OTHER PUBLICATIONS

Barton, "Electrosleeve Process for In-Situ Nuclear Steam Generator Repair", Fourth International Conference on CANDU Maintenance (Nov. 1997) 144-153.*

(Continued)

*Primary Examiner* — Jack W Keith
*Assistant Examiner* — Daniel Wasil
(74) *Attorney, Agent, or Firm* — Davidson, Davidson & Kappel, LLC

(57) ABSTRACT

A nuclear fuel cladding is provided. The nuclear fuel cladding includes a base cladding; and at least one nanomaterial layer deposited on a surface of the base cladding, the nanomaterial layer having an average grain size of between 5 to 400 nanometers. A method of manufacturing nuclear fuel cladding is also provided. The method includes depositing nanoparticles on a base cladding to form at least one nanomaterial layer, the nanoparticles having an average grain size of between 5 to 400 nanometers.

8 Claims, 5 Drawing Sheets

(56) References Cited

U.S. PATENT DOCUMENTS

| | | | | |
|---|---|---|---|---|
| 8,971,476 | B2* | 3/2015 | Mazzoccoli | G21C 3/07 376/416 |
| 9,472,310 | B2* | 10/2016 | Van Den Berghe | G21C 3/60 |
| 9,548,139 | B2* | 1/2017 | Zabiego | G21C 3/07 |
| 2003/0234181 | A1* | 12/2003 | Palumbo | C25D 5/02 205/76 |
| 2005/0069078 | A1* | 3/2005 | Stellwag | G21C 13/087 376/305 |
| 2008/0274282 | A1* | 11/2008 | Bent | C23C 16/04 427/255.28 |
| 2010/0206527 | A1 | 8/2010 | Hu et al. | |
| 2010/0269960 | A1* | 10/2010 | Hertz | G21C 3/20 148/558 |
| 2011/0256417 | A1* | 10/2011 | Cheruvu | C22C 19/05 428/546 |
| 2012/0051489 | A1* | 3/2012 | Varanasi | G21C 3/08 376/424 |
| 2012/0087457 | A1 | 4/2012 | Garnier et al. | |
| 2013/0251087 | A1* | 9/2013 | Short | G21C 3/07 376/414 |
| 2014/0241485 | A1* | 8/2014 | Di Fonzo | G21C 21/00 376/414 |
| 2015/0063523 | A1* | 3/2015 | Yacout | G21C 3/07 376/416 |
| 2016/0232991 | A1* | 8/2016 | Skoda | G21C 3/07 |

OTHER PUBLICATIONS

Lomello, "Processing of nano-SiC ceramics: Densification by SPS and mechanical characterization", Journal of European Ceramic Society 32 (2012) 633-641.*
Carradini, "Improved LWR Cladding Performance by EPD Surface Modification Technique", Project No. 09-766, Integrated University Programs, Nov. 30, 2012.*
Saji, "Corrosion protection and control using nanomaterials", Woodhead Publishing Limited, 2012.*
Lim, "Measurements of hydrogen permeation and absorption in zirconium oxide scales", Journal of Nuclear Materials 312 (2003).*
Tjong, "Nanocrystalline materials and coatings", Materials Science and Engineering R 45 (2004) 1-88.*
Maloy, "Advanced Cladding Materials for Fuels", NanoNuclear 2012, Jun. 2012.*
Nikulina, "Zirconium Alloy E635 as a Material for Fuel Rod Cladding and Other Components of VVER and RBMK Cores", Jan. 1996.*
International Search Report of corresponding International Application PCT/US2014/064644.
Ickchan Kim et al., "TiN-based coatings on fuel cladding tubes for advanced nuclear reactors," Journal of Nuclear Materials, Elsevier EV, NL, vol. 429, No. 1, pp. 143-148, XP028451898, ISSN: 0022-3115 (May 1, 2012).
Wang et al., "Ion irradiation effects in nanocrystalline TiN coatings," Nuclear Instruments & Methods in Physics Research, Section B—Beam Interactions with Materials and Atoms, Elsevier, Amsterdam, NL, vol. 261, No. 1-2, pp. 1162-1166, XP022152125, ISSN: 0168-583X (Jul. 19, 2007).
Federal Register, vol. 61, No. 158, pp. 42276 (Aug. 1996).
Majumdar, "Structural Evaluation of Electrosleeved Tubes Under Severe Accident Transients," Argonne National Laboratory (Oct. 1999).
"Study on Effect of Surface Nanocrystallization on Corrosion Property of Zr-4 Alloy", by Ye Linfeng, the China Master's Theses Full-text Database, the first volume of Engineering Technology, Jan. 15, 2009, Section 2.2 (in Chinese—see explanation in Translation of First Office Action for the Chinese Patent Application corresponding to the present application and comments from Chinese patent attorneys).
English Translation of the First Office Action dispatched by the State Intellectual Property Office of China dated Feb. 21, 2017 for the Chinese Patent Application corresponding to the present application.
Chinese patent attorney's comments on the First Office Action dispatched by the State Intellectual Property Office of China dated Feb. 21, 2017 for the Chinese Patent Application corresponding to the present application.

* cited by examiner

NUCLEAR FUEL ROD CLADDING INCLUDING A METAL NANOMATERIAL LAYER

The present invention relates generally to nuclear reactors and more specifically to a nuclear fuel rod cladding.

BACKGROUND

It is known to repair degraded steam generator tubes by process called electrosleeving, which involves electrochemically depositing an ultra-fine grained nickel on the inner surface of the degraded steam generator tubes.

An example of electrosleeving is disclosed in U.S. Pat. No. 5,352,266, which describes a process for producing nanocrystalline nickel having a grain size of less than 11 nanometers. U.S. Pat. No. 5,352,266 is hereby incorporated by reference herein.

U.S. Publication No. 2010/0269960 discloses a method of processing a component of zirconium or hafnium alloy by nano structuring a surface layer of the component so as to confer on the alloy over a thickness of at least 5 micrometers (μm) a grain size which is less than or equal to 100 nanometers (nm).

SUMMARY OF THE INVENTION

A nuclear fuel rod cladding is provided. The cladding includes a base cladding; and at least one nanomaterial layer deposited on a surface of the base cladding, the nanomaterial layer having an average grain size of between 5 to 400 nanometers.

A method of manufacturing nuclear fuel rod cladding is also provided. The method includes depositing nanoparticles on a base cladding to form at least one nanomaterial layer, the nanoparticles having an average grain size of between 5 to 400 nanometers.

BRIEF DESCRIPTION OF THE DRAWINGS

The present invention is described below by reference to the following drawings, in which.

DETAILED DESCRIPTION

Figure 1:
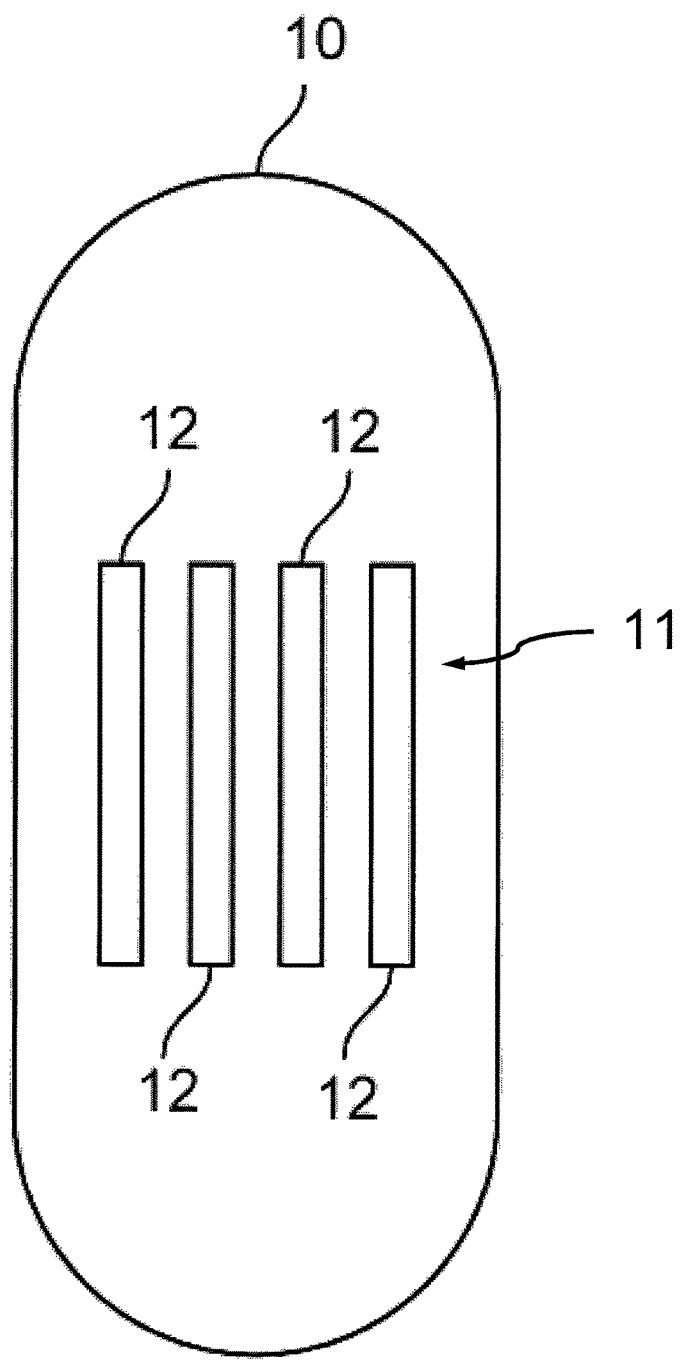
FIG. 1 schematically shows a nuclear reactor of a nuclear power plant.

The nuclear industry has strived to design and manufacture nuclear fuel with enhanced accident tolerance. Such fuels would tolerate loss of active cooling in the reactor core for extended periods of time while maintaining or improving the performance of the nuclear fuel during normal operation. While electrochemical deposition techniques such as electrosleeving have been used to apply nanoparticles to repair steam generator tubing for more than a decade, electrochemical deposition of nanoparticles on a base cladding has not been used or mentioned with respect to treating nuclear fuel rod cladding and electrochemical deposition of nanoparticles on a base cladding has not been used or mentioned to manufacture nuclear fuel rod cladding.

In the production of nuclear fuel rod cladding, oxygen (O) and alloying elements such as for example tin (Sn), iron (Fe), chromium (Cr), nickel (Ni), niobium (Nb), sulfur (S) are added to form zirconium alloys with the needed mechanical properties and corrosion resistance. Sn, O, S and Nb (partly) have high solubility in zirconium and are added as solid solution strengthening elements, Sn being also beneficial against corrosion. The other alloying elements, for example Fe, Cr, Ni, the part of Nb which is not in solid solution, are in the form of precipitates and are added to increase the corrosion resistance in high temperature water and steam, up to 400° C., with or without irradiation. The zirconium-based cladding tube may be in the recrystallized condition or the cold-worked and stress-relieved condition or in between, i.e. in a partially recrystallized condition. The average grain size of recrystallized cladding tube is equal to ASTM micrograin Size No. 7 or finer when determined in accordance with Test Methods E112, i.e. usually between 1 and 45 micrometers. Stress-relieved cladding tube contains dislocations and deformed elongated grains arranged in a heterogeneous structure. In the non-elongated direction, the grain size is similar to that of a recrystallized material. Throughout the specification, the term grain size corresponds to the grain size for the recrystallized cladding tubes and to the grain size in the non-elongated direction for the stress-relieved cladding tubes.

The zirconium-based cladding tube is obtained for instance by extrusion of billet with subsequent cold working with intermediate anneals until the final dimensions are reached. Other mechanical surface treatments, successive heating and cooling processes, or skin material grain shaping may be applied to the cladding to achieve a better corrosion resistance to various types of corrosion by water or steam from the reactor coolant system that may arise depending on the conditions of use of the alloy, such as for example nodular corrosion, generalized corrosion, shadow corrosion, and increased mechanical properties such as for example creep resistance, friction and wear resistance.

Present state-of-the-art nuclear fuel rod cladding, i.e. "standard" cladding made of zirconium-based alloy, is generally of average grain size as defined above. In comparison to standard cladding, a reduction in grain size resulting from cladding having a nanomaterial layer on a base cladding may prevent oxidation and hydriding because (1) smaller interspaces between nanoparticles impedes the progression of both oxygen and micro-penetration of fluids into deeper layers of the cladding and (2) smaller interspaces between nanoparticles impedes the penetration of hydrogen into deeper layers of the cladding.

Although surface treatments such as nanostructuring of standard nuclear fuel cladding have been proposed to reduce the grain size on the surface of the cladding so elements can be diffused between the grains, depositing metal or ceramic nanoparticles on standard cladding to increase resistance to degradation has not been considered. While nanostructuring standard cladding results in a Gaussian distribution of grain sizes, the deposition of metal nanoparticles or ceramic on standard cladding may achieve more uniform grain sizes. The deposition of metal or ceramic nanoparticles may also be more predictably and reproducibly applied to generate desired structural properties than nanostructuring, resulting in stronger bonds between the grains. Nanostructuring may also generate surface defects, damaging the surface properties of a metal, causing an additional surface layer to be applied to the nanostructured surface to generate a smooth, uniform surface before use in a nuclear reactor. In contrast, depositing metal or ceramic nanoparticles on a metal surface may result in a smooth, uniform outer surface with minimal defects, allowing for use in a nuclear reactor without applying an additional surface layer. Embodiments of the present invention may also including nanostructuring standard cladding and then applying nanoparticles to the nanostructured surface of the cladding.

Embodiments of the present invention provide nuclear fuel cladding that retains the mechanical strength characteristics and properties of the standard zirconium-based cladding obtained from the production operations, but adds additional mechanical strength and resistance to degradation by depositing metal or ceramic nanoparticles on an outer and/or inner surface of the standard cladding at locations where maximum stresses or thermal gradients appear during extended fuel rod operation.

Embodiments of the present invention may advantageously improve nuclear fuel rod cladding to help form accident tolerant nuclear fuel that is highly resistant to corrosion and hydriding by primary water or steam from the reactor coolant system, and to other forms of degradation. The cladding described herein may present an active barrier to hydrogen diffusion from reactor water and fission gases released from the fuel. The cladding may be formed by intimately connecting a nanomaterial layer to an inner and/or outer surface of a standard base cladding, throughout the entire surface or at specific locations expected to be subjected to increased forces. The nanomaterial layer may be formed by depositing nanoparticles in layers on top of the surface of the standard cladding material. In some embodiments, the standard cladding may be nanostructured before the nanoparticles are deposited. The nanoparticles may be of the same material as the standard cladding or different materials than the material of the standard cladding and, in a preferred embodiment, a total thickness of the layers of nanoparticles deposited is equivalent to two to one hundred times the average grain size of the standard cladding material.

FIG. 1 schematically shows a nuclear reactor 10 of a nuclear power plant including a plurality of nuclear fuel rods 12 in the core 11 of nuclear reactor 10. Fuel rods 12 include a fissile material that produces the thermal energy powering the nuclear power plant. Since the fuel rod 12 is the first barrier against disseminating radioactive material into the nuclear power plant and potentially the environment, maintaining or improving the characteristics and properties of fuel rods 12 in the conditions prevailing during fuel operation are paramount to safe and economical operation of the nuclear power plant. Fuel operation includes the operation of fuel rods 12 in reactor core 11 under normal operating loads, operational transients and fault operating conditions, and outside the reactor core 11 during shipment, storage and handling of fuel rods 12.

Figure 2A:
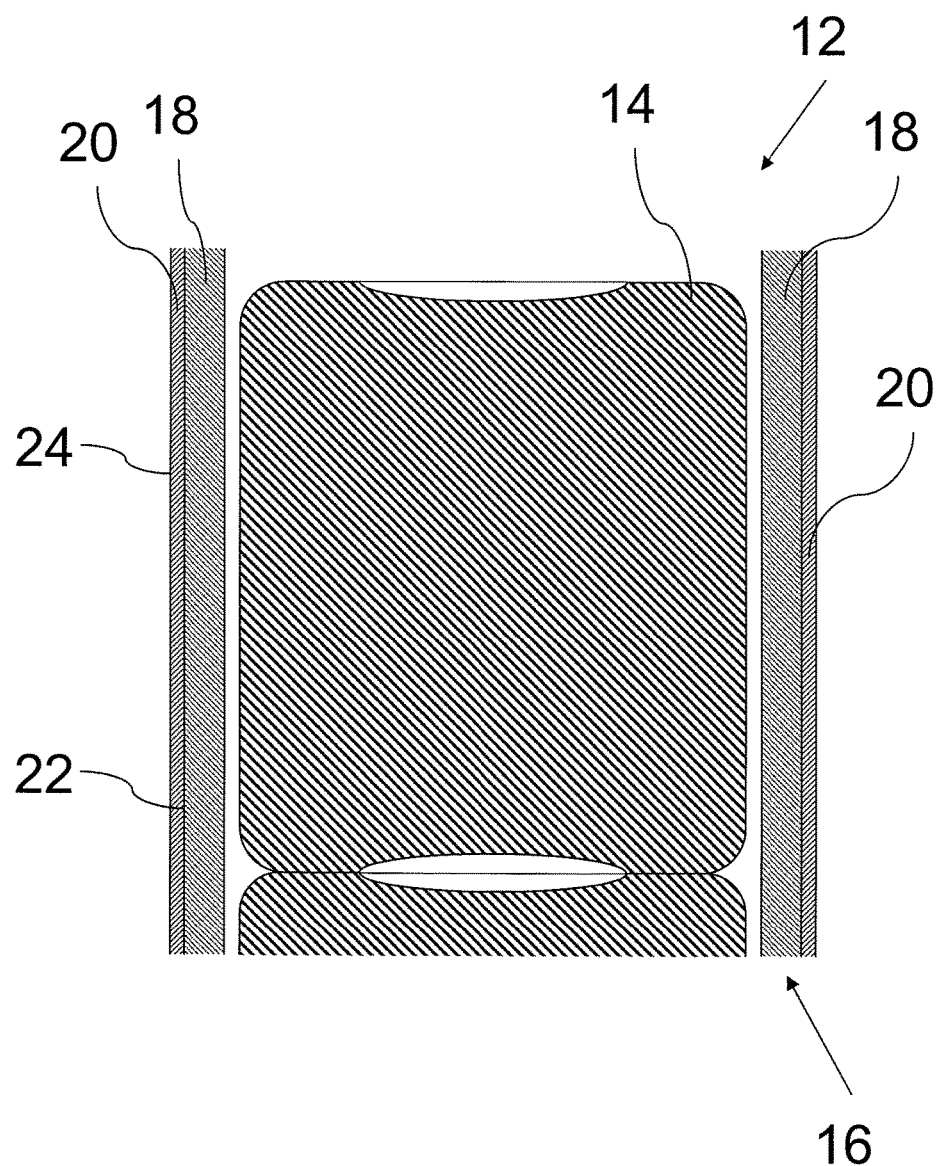
FIG. 2a shows a cross-sectional view of a portion of a nuclear fuel rod including cladding formed in accordance with an embodiment of the present invention.

FIG. 2a shows a cross-sectional view of a portion of a fuel rod 12 formed in accordance with an embodiment of the present invention. Fuel rod 12 includes fissile material in the form of a plurality of nuclear fuel pellets 14 stacked vertically, with only one being represented in its entirety in FIG. 2a. Fuel pellets 14 are surrounded by a cylindrical encasing of cladding 16, which forms a barrier between coolant in contact with and circulating around the outer surface of cladding 16. Cladding 16 is designed to prevent fragments of fissile material and fission products from entering into the coolant, ideally even in extreme conditions such as accidents in the nuclear reactor 10. Since cladding 16 is the first barrier against disseminating radioactive material into the environment, maintaining/improving the mechanical and corrosion properties of cladding 16 in the conditions prevailing during fuel operation is paramount to the safe operation of a nuclear power plant. Cladding 16 includes a base cladding 18 and at least one nanomaterial layer 20 deposited on the outer surface 22 of base cladding 18, forming an outer surface 24 of cladding 16. The at least one nanomaterial layer 20 may include two or more nanomaterial layers 20, with each layer 20 being formed of a different composition. For one example, a first layer 20 on base cladding 18 may be formed of zirconium nanoparticles 26 and a second layer 20 formed on the first layer 20 may be formed of titanium nanoparticles 26. For another example, a first layer 20 on base cladding 18 may be formed of zirconium nanoparticles 26, a second layer 20 formed on the first layer 20 may be formed of titanium nanoparticles 26 and a third layer 20 formed on the second layer 20 may be formed of ceramic nanoparticles 26.

Figure 2B:
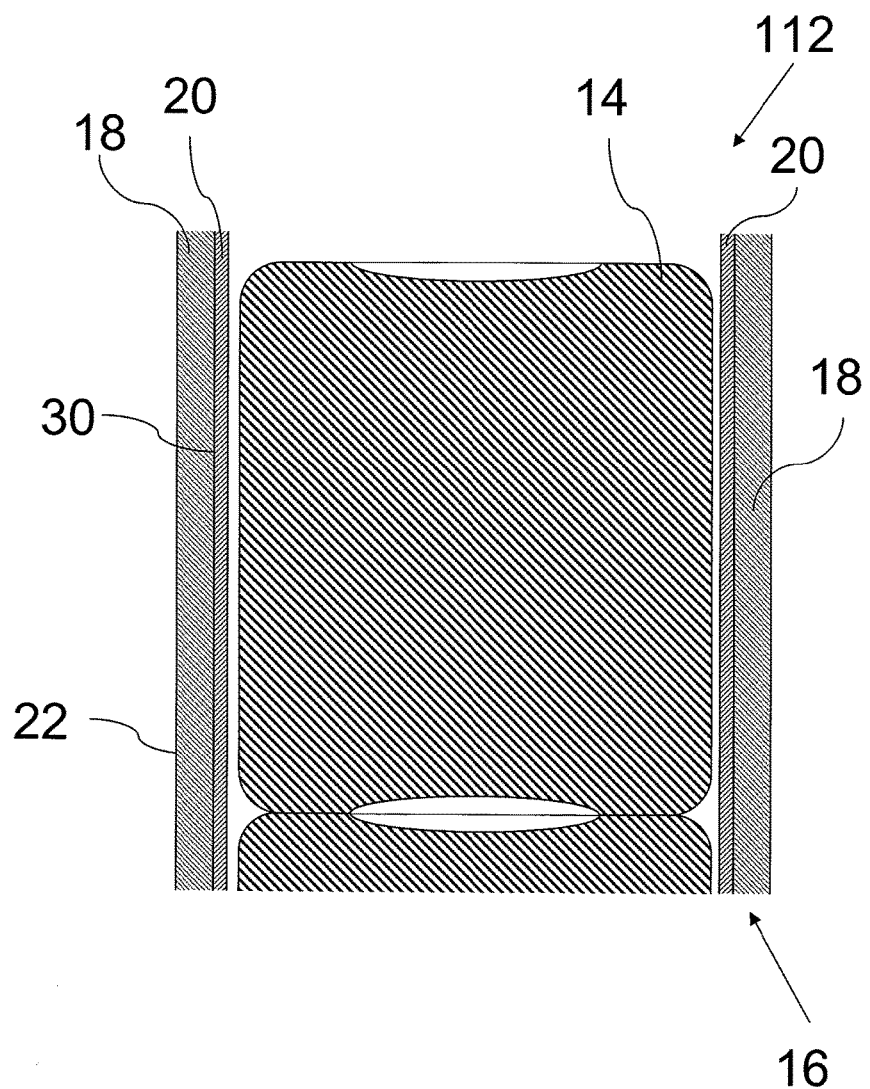
FIG. 2b shows a cross-sectional view of a portion of a nuclear fuel rod including cladding formed in accordance with another embodiment of the present invention.

FIG. 2b shows a cross-sectional view of a portion of a fuel rod 112 formed in accordance with another embodiment of the present invention. In this embodiment, instead of nanomaterial layer 20 being deposited on outer surface 22 of base cladding 18, nanomaterial layer 20 is deposited on an inner surface 30 of base cladding 18 to form the cladding 16.

Figure 2C:
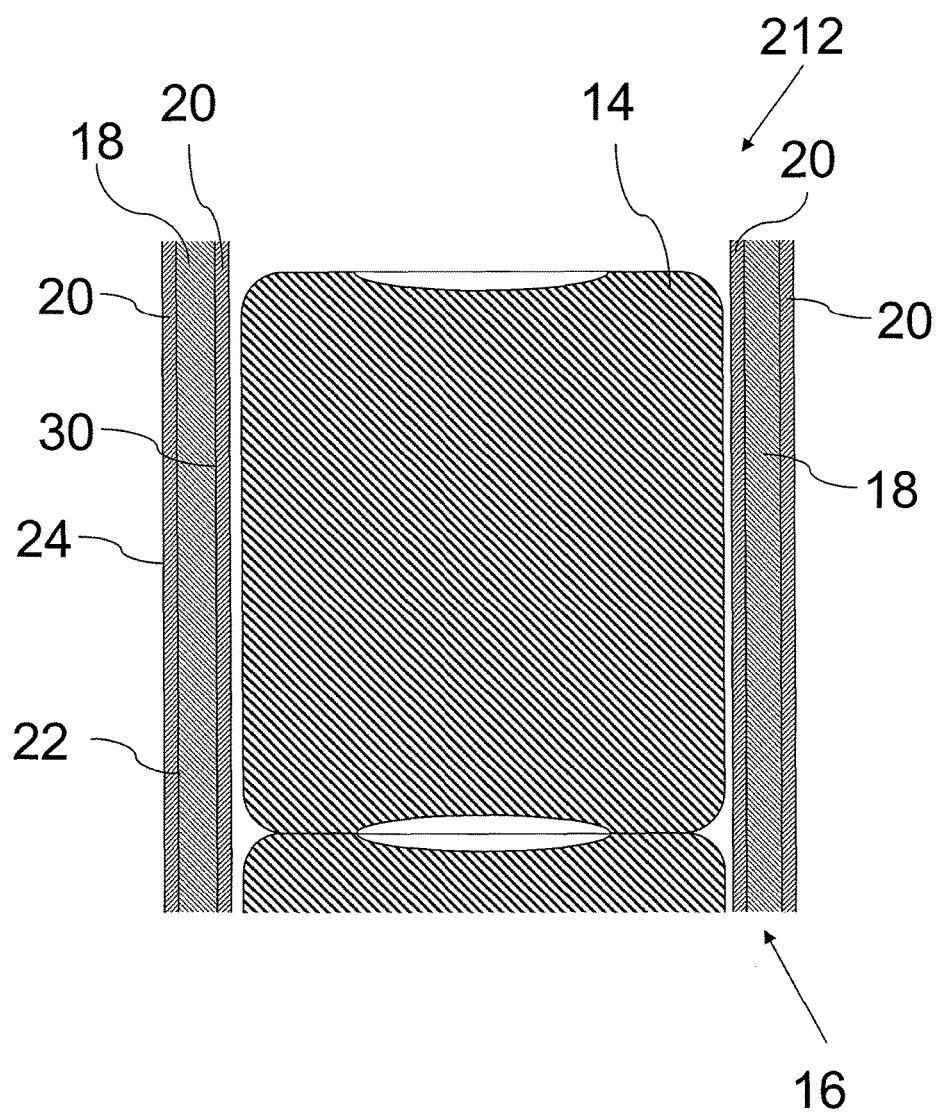
FIG. 2c shows a cross-sectional view of a portion of a nuclear fuel rod including cladding formed in accordance with yet another embodiment of the present invention.

FIG. 2c shows a cross-sectional view of a portion of a fuel rod 212 formed in accordance with yet another embodiment of the present invention. In this embodiment, one nanomaterial layer 20 is deposited on outer surface 22 of base cladding 18 and another nanomaterial layer 20 is deposited on inner surface 30 of base cladding 18 to form cladding 16.

Figure 3:
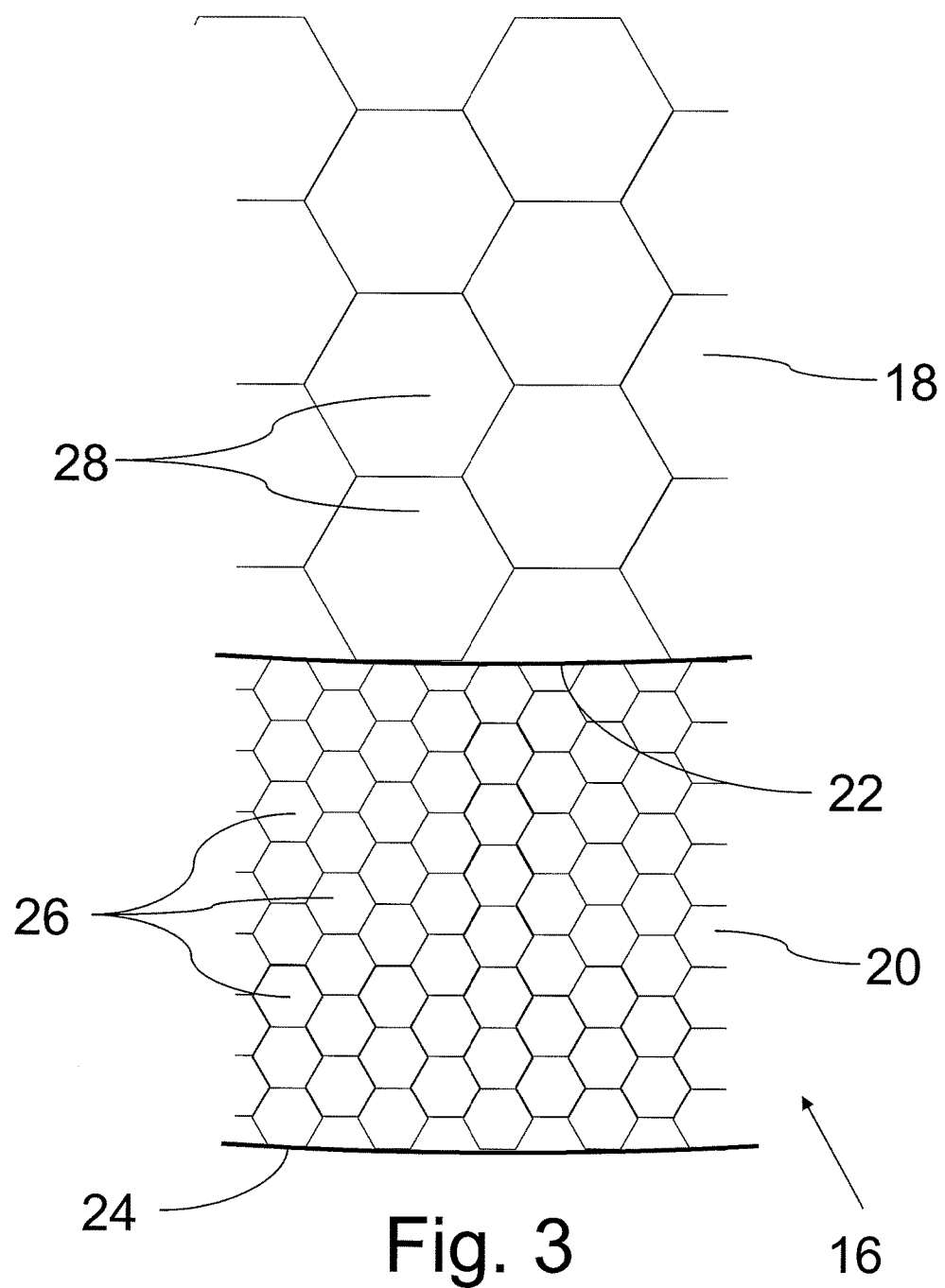
FIG. 3 shows a cross-sectional view of a portion of a nanomaterial layer formed on a base cladding of a nuclear fuel rod cladding formed in accordance with an embodiment of the present invention.

As shown in one exemplary embodiment in FIG. 3, which illustrates a cross-sectional area of cladding 16 with a base cladding 18 made of recrystallized zirconium-based alloy, grains of nanomaterial layer 20, which are each formed by a nanoparticle 26, are smaller than the grains 28 of base cladding 18. In this illustration, grains 28 are approximately three times as thick as nanoparticles 26 and nanomaterial layer 20 has a total thickness of 2⅔ grains 28 of base cladding 18; however, in preferred embodiments of the present invention, nanoparticles 26 are comparatively much smaller in comparison to grains 28. In preferred embodiments, nanoparticles 26 have an average size between 5 and 400 nanometers, grains 28 of base cladding 18 have an average grain size between 4 and 70 μm and a total thickness of the nanomaterial layer 20 is equivalent to two to one hundred times the average size of grains 28. Although nanoparticles 26 and grains 28 are shown as being hexagonal, such a shape is merely exemplary. Nanoparticles 26 and grains 28 may be any regular or irregular shape and grain sizes may vary to one order of magnitude within the base cladding 18, and the nanomaterial layer 20.

Nanomaterial layer 20 may be deposited on base cladding 18 through various methods including sputtering, gas condensation, electrochemical deposition (e.g. electrosleeving), and sintering. Nanoparticles 26 of nanomaterial layer 20 may be applied at various locations or through the whole length of the cladding 16 of the fuel rod 12 and may include, a number of layers 20 of nanoparticles 26 intimately connected with the base cladding 18. The exemplary embodiment shown in FIG. 3 shows approximately eight layers of nanoparticles 26. The deposition of the nanoparticles 26 on base cladding 18 covers the irregularities of the base cladding 18 resulting during the fabrication of base cladding 18.

After being applied to base cladding 18, nanomaterial layer 20 serves to dissipate forces applied on the surface of a cladding 16 of a fuel rod 12 through the intercrystalline components (such as grain boundaries, crystallographic texture, triple lines, and quadruple nodes) of the layers of nanomaterial layer 20. In addition, by properly selecting the appropriate composition of nanomaterial layer 20, the corrosion and hydriding behavior of fuel rod 12 can by influenced by altering the surface electrochemical potential (ECP) and hydrogen permeability of cladding 16.

In preferred embodiments, nanomaterial layer 20 has a composition including a deposited metal (minimum 99%), with small amounts of other additives, and the remaining impurities not exceeding the values as indicated in ASTM Specification B811-13 for nuclear fuel cladding. The deposited metal may be for example, stainless steel, zirconium, titanium, or another corrosion-resistant species. The formation of nanomaterial layer 20 transforms outer surface 22 and/or inner surface 30 of base cladding 18 by adding nanocrystalline materials (i.e., nanoparticles 26) to base cladding 18, for example, using a technique similar to the electrochemical deposition technique described in U.S. Pat. No. 5,352,266. The huge electrochemical forces exerted in the electrochemical deposition process pack very uniformly the electrically charged metal atoms of nanomaterial layer 20.

Prior to depositing nanomaterial layer 20 on base cladding 18, the reactor core 11 in which the fuel rod 12 is intended to be used may be analyzed to determine areas of the fuel rod 12 that are susceptible to degradation during operation in the reactor core 11. The susceptibility of areas of the fuel rod 12 to degradation may be determined for example by analyzing spent fuel rods 12 previously used in the reactor core 11 or by performing computer simulations of the reactor core 11.

The corrosion rate of zirconium alloy cladding is controlled for instance by the migration/diffusion of oxygen to the zirconium oxide-cladding interface for Zircaloy alloys and by metal/oxide interfacial reaction for Zr—Nb alloys. The hydrogen pick-up of zirconium alloy cladding depends on the one hand on the hydrogen quantity made available by the oxidation of the alloy and on the other hand on the hydriding rate of the alloy. The deposition of nanomaterial layer 20 on base cladding 18 may provide protection against corrosion (general and nodular) by using oxidation-resistant material such as for instance stainless steel, titanium, and ceramic, for example SiC. Nanomaterial layer 20 may also provide hydriding protection to base cladding 18 if the nanomaterial layer 20 is a hydrogen barrier.

As noted above, in preferred embodiment nanomaterial layer 20 has a nanoparticle size between 5 to 400 nanometers. Because of the direct relationship between nanoparticle size and material hardness, the nanomaterial deposited has the Vickers Hardness between 250 and 440 VHN units. This may have a positive effect on the friction behavior of the cladding 16 reducing the risk of shaving and scraps formation during fuel assembly manufacturing or reparation and especially during fuel rod insertion into the fuel assembly cage. It may also have a positive effect on wear resistance of the cladding 16 under operation, limiting the risk of leakage due to vibrations and fretting.

A nanomaterial layer 20 applied to base cladding 18 by electrochemical deposition forms a cladding 16 having excellent resistance to hydrogen molecular diffusion through its structure and exceptional resistance to diffusion of radioactive gases generated by the fuel pellets 14 during operation, thereby optimizing the resistance of cladding 16 to hydrogen windowing effects.

The preferred embodiment of the method of placing nanoparticles 26 on at least one of the inner and outer 30, 22 surfaces of base cladding 18 is an electrochemical deposition process including steps of activation 100, pre-filming 102 and electroforming 104.

The activation step 100, which may be a Woods step, includes cleaning a surface 22, 30 of a base cladding 18 with a powerful acid to dislodge surface grains 28 that protrude from the surface 22, 30 of the base cladding 18. The surface 22, 30 of base cladding 18 may be placed in an acid bath of a combination of for instance fluonitric acid or hydrofluoric acid and hydrochloric acid, and a metal salt at very low pH ($\leq 0.5$). The metal salt utilized is dependent on the metal being deposited. In a preferred embodiment, wherein zirconium nanoparticles 26 are deposited, the metal salt used in the activation step is zirconium salt. In other embodiments, the metal salt may include titanium (where titanium nanoparticles 26 are deposited) or nickel (where nickel nanoparticles 26 are deposited) or a mixture thereof and/or other metal. Alternating current is then applied to the acid bath to improve the removal of a native surface layer of base cladding 18 and provides a pristine activated surface on the base cladding 18.

Next, in pre-filming step 102, referred to as a Strike step, a pre-filming layer for a nanomaterial layer 20, is formed on the activated surface of the base cladding 18. Pre-filming step 102 includes adding an electroplated layer of micron grain size pure metal using a low pH (1.20-2.5). In case of zirconium nanoparticle deposition, the activated base cladding 18 is placed in a bath of a solution of zirconium salt with fluonitric acid or hydrofluoric and/or hydrochloric acid. In other embodiments, the metal salt may include titanium (where titanium nanoparticles 26 are deposited) or nickel (where nickel nanoparticles 26 are deposited) or a mixture thereof and/or other metal. In each case, the metal-acid solution is circulated on top of the activated surface of base cladding 18 while forward current is applied for deposition. Pre-filming 102 prevents repassivation of base cladding 18 between activation step 100 and electroforming step 104 and facilitates the adhesion of nanomaterial deposition to the surface 22, 30 of the base cladding 18. Pre-filming 102 also fills in the valleys left by the protruding grains 28 that were removed in the activation step 100.

Electroforming step 104, which may be a Watts step, includes electrochemically depositing the metal nanoparticles 26 on the pre-filming layer, which is the fresh layer of micron grain size metal particles formed in pre-filming step 102. The pre-filmed base cladding 18 is placed in a bath of solution used to deposit the nanoparticles 26. The solution may consist of a metal sulfate (zirconium sulfate in the preferred embodiment and titanium sulfate and/or nickel sulfate and/or other metal sulfate in the corresponding alternative embodiments) and an additive to manage the size of the nanoparticles 26. The size-managing additive and a metal carbonate of the deposition metal are metered into the solution to maintain an acceptable pH, which in a preferred embodiment is between 1.5 and 2.8, and replenish the metal sulfate and size-managing additive that have been deposited out of solution. The size-managing additive limits grain size of the nanomaterial layer 20 by preventing crystal growth past a predetermined upper limit during the deposition process.

A number of Watts solution rinses for zirconium deposition (which constitutes waste at the end of the process) and nitrogen purges or deionized water and nitrogen purges for nickel, titanium, or other nanodeposited metal are used between steps 102 and 104 to remove the residual chlorides that may contaminate the Watts solution.

A surfactant is added to the Woods, Strike and Watts solutions to keep the surface tension of the solution between 2.5 to 3.5 Pa.

Woods and Strike bath adjustments for pH during activation step 100 and pre-filming step 102 are made with acid, for instance hydrochloric acid and acid, for instance sulfuric acid, or metal carbonate slurry are used for Watts solution during step 104, in quantities as specified by the process requirements.

In the preceding specification, the invention has been described with reference to specific exemplary embodiments and examples thereof. It will, however, be evident that various modifications and changes may be made thereto without departing from the broader spirit and scope of invention as set forth in the claims that follow. The specification and drawings are accordingly to be regarded in an illustrative manner rather than a restrictive sense.

What is claimed is:

1. A method of manufacturing nuclear fuel cladding comprising:
   depositing nanoparticles on a base cladding to form at least one nanomaterial layer, the nanoparticles having an average grain size of between 5 to 400 nanometers, the at least one nanomaterial layer including two nanomaterial layers, each having a different composition, the two nanomaterial layers including a first nanomaterial layer formed of first nanoparticles and a second nanomaterial formed of second nanoparticles,
   the depositing of nanoparticles on the base cladding comprising:
   depositing the first nanoparticles on an outer surface of the base cladding to form the first nanomaterial layer, the first nanoparticles consisting of one of metal nanoparticles or ceramic nanoparticles, and
   depositing the second nanoparticles on an outer surface of the first nanomaterial layer to form the second nanomaterial layer, the second nanoparticles consisting of the other of metal nanoparticles or ceramic nanoparticles.

2. The method as recited in claim 1 wherein the depositing includes electrochemically depositing the nanoparticles on the base cladding.

3. The method as recited in claim 1 wherein the depositing comprises:
   activating the base cladding such that a native surface layer of base cladding is removed;
   forming a pre-filming layer on the base cladding after the native surface layer is removed; and
   electrochemically depositing the nanoparticles on the pre-filming layer.

4. The method as recited in claim 3 wherein the electrochemically depositing the nanoparticles on the pre-filming layer comprises adding an additive to limit grain sizes of the nanomaterial layer by preventing crystal growth past a predetermined upper limit.

5. The method as recited in claim 1 wherein the base cladding is formed of a zirconium alloy.

6. The method as recited in claim 1 further comprising nanostructuring the base cladding before depositing the nanoparticles on the base cladding.

7. The method as recited in claim 1 wherein the nanomaterial layer has a thickness of two to one hundred times an average grain size of the base cladding.

8. The method as recited in claim 7 wherein the base cladding has an average grain size between 4 and 70 μm.

* * * * *